(12) United States Patent
Byun et al.

(10) Patent No.: US 10,014,799 B2
(45) Date of Patent: Jul. 3, 2018

(54) TRIBOELECTRIC GENERATOR

(71) Applicant: Samsung Electronics Co., Ltd., Suwon-si, Gyeonggi-do (KR)

(72) Inventors: Kyung-Eun Byun, Uijeongbu-si (KR); Minsu Seol, Suwon-si (KR); Hyeonjin Shin, Suwon-si (KR); Seongjun Park, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 352 days.

(21) Appl. No.: 14/843,020

(22) Filed: Sep. 2, 2015

(65) Prior Publication Data

US 2016/0359429 A1 Dec. 8, 2016

(30) Foreign Application Priority Data

Jun. 2, 2015 (KR) .................. 10-2015-0078241

(51) Int. Cl.
*H02N 1/04* (2006.01)
(52) U.S. Cl.
CPC .................... *H02N 1/04* (2013.01)
(58) Field of Classification Search
CPC ....................................................... H02N 1/04
See application file for complete search history.

(56) References Cited

U.S. PATENT DOCUMENTS

| | | | |
|---|---|---|---|
| 2011/0148248 A1* | 6/2011 | Landa | H01J 45/00 310/306 |
| 2014/0300248 A1 | 10/2014 | Wang et al. | |

FOREIGN PATENT DOCUMENTS

| | | |
|---|---|---|
| CN | 203534735 U | 4/2014 |
| EP | 3001557 A1 | 3/2016 |
| KR | 1985801767 | 11/1985 |
| KR | 2007-0103381 A | 10/2007 |
| KR | 2014-0128742 A | 11/2014 |
| WO | WO-2014-166286 A1 | 10/2014 |

OTHER PUBLICATIONS

Yeong Hwan Ko et al., "Multi-stacked PDMS-based triboelectric generators with conductive textile for efficient energy harvesting", The Royal Society of Chemistry, 2015, 5, p. 6437-42.
Sung-Ho Shin et al., "Triboelectric Charging Sequence Induced by Surface Functionalization as a Method to Fabricate High Performance Triboelectric generators", American Chemical Society, 2015, vol. 9, No. 4, p. 4621-27.

(Continued)

*Primary Examiner* — Ramon M Barrera
(74) *Attorney, Agent, or Firm* — Harness, Dickey & Pierce, P.L.C.

(57) ABSTRACT

Example embodiments relate to triboelectric generators that include a first electrode and a triboelectric material layer facing first electrode, and a self-assembled monolayer that is combined with a surface of the first electrode or a surface of the triboelectric material layer between the first electrode and the triboelectric material layer. The self-assembled monolayer is formed of or include a material that includes a silane group, a silanol group, or a thiol group according to a material to be combined.

8 Claims, 5 Drawing Sheets

(56) References Cited

OTHER PUBLICATIONS

Zhong Lin Wang, "Triboelectric Nanogenerators as New Energy Technology for Self-Powered Systems and as Active Mechanical and Chemical Sensors", American Chemical Society, 2013, p. A-Y.
H. Tarik Baytekin et al,. "Control of Surface Charges by Radicals as a Principle of Antistatic Polymers Protecting electronic Circuitry", Science, American Association for the Advancement of Science, vol. 341, 2013, p. 1368-71.
Xiao Yan Wei et al., "Surface-charge engineering for high-performance triboelectric nanogenerator based on identical electrification materials", Nano Energy, Elsevier Ltd., 2014, vol. 10, p. 83-89.
Seol, Myeong-Lok, et al., "Nature-Replicated Nano-in-Micro Structures for Triboelectric Energy Harvesting," SMALL, vol. 10, No. 19, Oct. 1, 2014, pp. 3887-3894, XP055305288.
Guo, X D, et al., "Layer-by-layer polyelectrolyte films for contact electric energy harvesting," Journal of Physics D: Applied Physics, Institute of Physics Publishing Ltd, GB, vol. 48, No. 7, Feb. 2, 2015, p. 75302 (1-9), XP020278923.
Jeong, chang Kyu, et al., "Topographically-Designed Triboelectric Nanogenerator via Block Copolymer Self-Assembly," Nano Letters, vol. 14, No. 12, Dec. 10, 2014, pp. 7031-7038, XP055305363.
Akbulut, Mustafa et al., "Triboelectrification between Smooth Metal Surfaces Coated with Self-Assembled Monolayers (SAMs) +," The Journal of Physical Chemistry B, vol. 110, No. 44, Nov. 1, 2006, pp. 22271-22278, XP055075108.
European Search Report dated Oct. 4, 2016 for corresponding European Patent Application No. 16171138.7.

* cited by examiner

TRIBOELECTRIC GENERATOR

CROSS-REFERENCE TO RELATED APPLICATION

This application claims the benefit of priority from Korean Patent Application No. 10-2015-0078241, filed on Jun. 2, 2015, in the Korean Intellectual Property Office, the disclosure of which is incorporated herein in its entirety by reference.

BACKGROUND

1. Field

Example embodiments relate to triboelectric generators including a self-assembled monolayer.

2. Description of the Related Art

The technology of generating triboelectricity is a technology of generating electricity from a potential difference between two triboelectric members that are induced by frictions generated at an interface between the two different triboelectric members by external pressure or vibration. The technology of generating triboelectricity typically provides an output voltage approximately that is from 10 times to 100 times the voltage provided via the technology of generating piezoelectricity.

An output voltage of a triboelectric generator is generally determined by the characteristics of a triboelectric material (work function, ionization trend, chemical potential, etc.) and compositions and surface structures of the triboelectric members. In generating induction electricity from static electricity induced by friction, since a triboelectric generator of the related art depends on an electrification characteristic of triboelectric members, the selection of the triboelectric members is limited.

There is a method of increasing an output voltage by doping a triboelectric member. However, this method may be applied to a material, for example, a polymer that can be easily doped, but may be difficult to apply to a metal or a metal oxide.

SUMMARY

Example embodiments relate to triboelectric generators having a self-assembled monolayer on a surface of a triboelectric member.

Additional example embodiments will be set forth in part in the description which follows and, in part, will be apparent from the description, or may be learned by practice of the example embodiments.

According to example embodiments, a triboelectric generator includes a first electrode and a triboelectric material layer facing the first electrode, and a self-assembled monolayer that is combined with a surface of the first electrode or a surface of the triboelectric material layer between the first electrode and the triboelectric material layer.

The first electrode may include a metal, and the self-assembled monolayer may include a thiol group combined with the surface of the first electrode.

The first electrode may include a metal oxide, and the self-assembled monolayer may include a silane group or a silanol group combined with the surface of the first electrode.

The self-assembled monolayer may have a thickness in a range from about 0.2 nm to about 5 nm.

The triboelectric material layer may include a polymer that has a greater amount of negative charges than the first electrode when there is a friction between the triboelectric material layer and the first electrode.

The self-assembled monolayer may include a first self-assembled monolayer formed on the surface of the first electrode facing the triboelectric material layer and a second self-assembled monolayer formed on the surface of the triboelectric material layer facing the first self-assembled monolayer.

According to example embodiments, a triboelectric generator includes a first electrode and a second electrode facing each other, and a first self-assembled monolayer formed on a surface of the first electrode facing the second electrode.

The triboelectric generator may further include a second self-assembled monolayer formed on the second electrode to face the first self-assembled monolayer.

The triboelectric generator may further include a first triboelectric material layer disposed between the first electrode and the first self-assembled monolayer, and the first self-assembled monolayer may include a head group that combines with a surface of the first triboelectric material layer.

The triboelectric generator may further include a second triboelectric material layer disposed between the second electrode and the second self-assembled monolayer, and the second self-assembled monolayer may include a head group combined with a surface of the second triboelectric material layer.

BRIEF DESCRIPTION OF THE DRAWINGS

These and/or other example embodiments will become apparent and more readily appreciated from the following description, taken in conjunction with the accompanying drawings in which.

DETAILED DESCRIPTION

Figure 1:
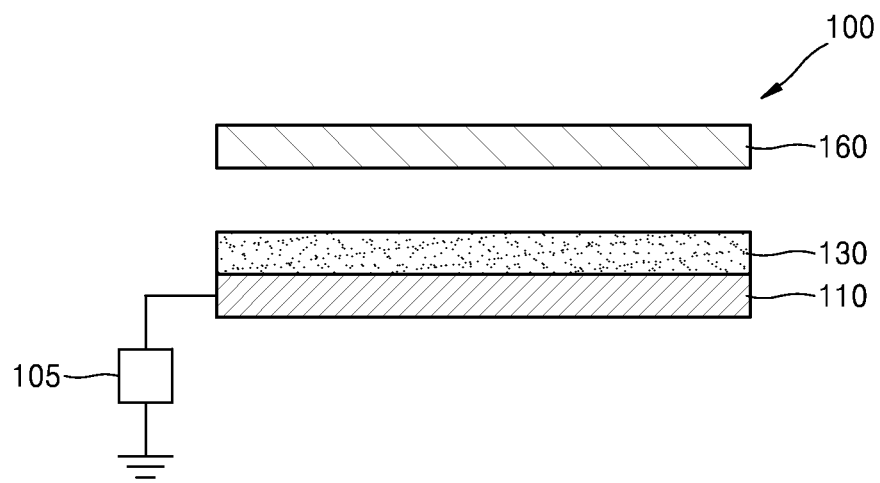
FIG. 1 is a schematic cross-sectional view of a triboelectric generator according to an example embodiment.

Reference will now be made in detail to example embodiments illustrated in the accompanying drawings. In the drawings, thicknesses of layers and regions may be exaggerated for clarity of layers and regions. The example embodiments are capable of various modifications and may be embodied in many different forms. Like reference numerals refer to like elements throughout. The same reference numbers indicate the same components throughout the specification.

It will be understood that when an element is referred to as being "on," "connected" or "coupled" to another element, it can be directly on, connected or coupled to the other element or intervening elements may be present. In contrast, when an element is referred to as being "directly on,"

"directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

FIG. 1 is a schematic cross-sectional view of a triboelectric generator 100 according to an example embodiment.

Referring to FIG. 1, the triboelectric generator 100 includes a self-assembled monolayer 130 formed on a first electrode 110 and a triboelectric material layer 160 that faces the self-assembled monolayer 130 and is separated from the self-assembled monolayer 130 by a desired, or alternatively, predetermined gap.

The first electrode 110 may be a metal formed of or including Al, Cu, Mg, W, Fe, Pt, Au, Ag, Ta, Ti, Pd, Ru, or an alloy of these metals. The first electrode 110 may be a metal oxide that includes indium tin oxide (ITO).

When the first electrode 110 is formed of or includes a metal, the self-assembled monolayer 130 may include a thiol group and a functional group ($CH_3$, $CF_3$, COOH, $NH_2$, etc.). The self-assembled monolayer 130 includes a carbon chain between the thiol group and the functional group. The carbon chain may be hydrocarbon and/or fluorocarbon. For example, the self-assembled monolayer 130 may be hydrocarbon thiol, such as methane thiol $CH_3SH$ and ethane thiol $C_2H_5SH$. The self-assembled monolayer 130 may be HS—$(CH_2)_n$—$CH_3$ or HS—$(CH_2)_n$—$(CF_2)_m$—$CF_3$ where N and M are respectively integers of 1~30.

The thiol group of the self-assembled monolayer 130 may be combined with a surface of the first electrode 110.

When the first electrode 110 is formed of or includes ITO, the self-assembled monolayer 130 may include a head group, such as, a silane group, a silazane group, and a silanol group $Si(OCH_3)_3$, $Si(OC_2H_5)_3$, a functional group ($CH_3$, $CF_3$, COOH, $NH_2$, etc.), and a carbon chain that connects the head group and the functional group. The carbon chain may include a hydrocarbon and/or a fluorocarbon. The self-assembled monolayer 130 may be hydrocarbon silane that includes a silane group. For example, the self-assembled monolayer 130 may be (3_aminopropyl) triethoxysilane (APTES), n-propyltriethoxysilane (PTES), (3,3,3-trifluoropropyl)trimethoxysilane ($FAS_3$), or (3-mercaptopropyl) trimethoxysilane (MPTMS). The silane group of the self-assembled monolayer 130 is the head group and combines with the surface of the first electrode 110.

Also, the self-assembled monolayer 130 may be $Si(OC_2H_5)_3$—$(CH_2)_n$—$NH_2$. Here, N is an integer of 1~30, and when N=3, the self-assembled monolayer 130 is APTES. The self-assembled monolayer 130 may be $Si(OCH_3)_3$—$(CH_2)_n$—$CF_3$. Here, N is an integer of 1~30, and when N=2, the self-assembled monolayer 130 is $FAS_3$.

The self-assembled monolayer 130 may be $Si(OCH_3)_3$—$(CH_2)_n$—$(CF_2)_m$—$CF_3$, where N and M are respectively integers of 1~30.

The self-assembled monolayer 130 may be hexamethyldisilazane (HMDS) that includes a silazane group.

The triboelectric material layer 160 may be formed of or include a material having a large potential that is formed by friction with the first electrode 110 in a triboelectric series rating. For example, the triboelectric material layer 160 may be formed of or include a polymer. However, the example embodiment is not limited thereto. That is, the triboelectric material layer 160 may be formed of or include a material besides a polymer, for example, a non-metallic material.

The self-assembled monolayer 130 changes a surface characteristic of the first electrode 110 and may increase the amount of electrical energy generated by friction with the triboelectric material layer 160. That is, a friction characteristic of the first electrode 110 may be readily improved.

The self-assembled monolayer 130 may be formed by using a solution process, a chemical vapor deposition method, a physical vapor deposition, a spin coating process, or other technique.

A magnitude of triboelectric energy that is generated may vary according to the functional group of the self-assembled monolayer 130.

A thickness of the self-assembled monolayer 130 may vary according to the number of carbon chains of the self-assembled monolayer 130. For example, the self-assembled monolayer 130 may have a thickness in a range from about 0.2 nm to about 5 nm. When the self-assembled monolayer 130 is formed of or includes HMDS, the number of carbon chains is one (1) and may have a thickness of approximately 0.2 nm. When the self-assembled monolayer 130 is formed of or includes (hexadecyloxy)trimethylsilane, the number of carbon chains is twenty-six (26) and may have a thickness of approximately 5 nm.

Charges generated due to the friction between the triboelectric material layer 160 and the self-assembled monolayer 130 move to an electrical load 105 connected to the first electrode 110, and accordingly, electrical energy is generated.

The triboelectric generator 100 according to an example embodiment may be achieved by forming a self-assembled monolayer on a surface of an electrode, and thus, a larger triboelectric energy may be generated when compared to a triboelectric energy generated by only using an electrode as a triboelectric material layer.

Figure 2:
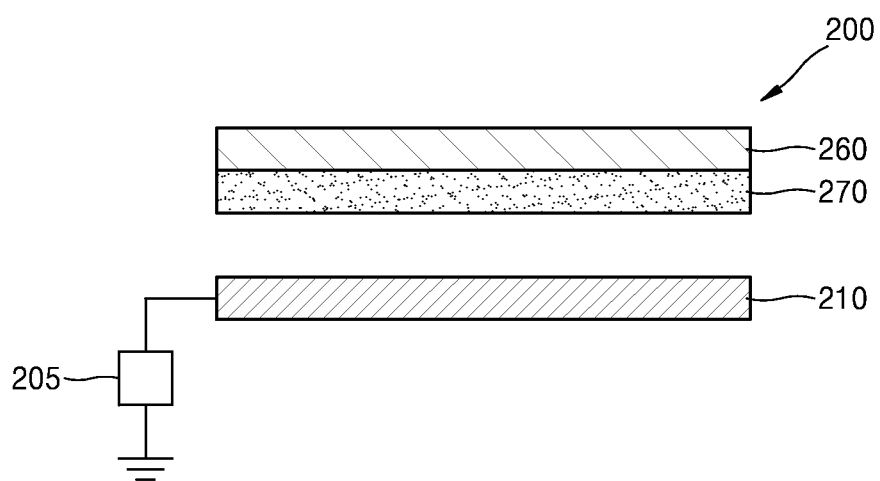
FIG. 2 is a schematic cross-sectional view of a triboelectric generator according to another example embodiment.

FIG. 2 is a schematic cross-sectional view of a triboelectric generator 200 according to another example embodiment. Like reference numerals are used to indicate elements that are the same or equivalent to elements of FIG. 1, and the description thereof will not be repeated. Constituent elements that are different from the elements of FIG. 1 will be mainly described.

Referring to FIG. 2, the triboelectric generator 200 includes a first electrode 210 and a triboelectric material layer 260 that is separated from the first electrode 210 by a desired, or alternatively, predetermined gap. A self-assembled monolayer 270 is formed on a surface of the triboelectric material layer 260 facing the first electrode 210.

The triboelectric material layer 260 may be formed of or include a polymer or a non-metallic material. For example, the triboelectric material layer 260 may be an oxygen containing polymer, such as polydimethylsiloxane (PDMS), polyethylene terephthalate, and polyimide, or a non-metallic material, such as, silicon oxide and aluminum oxide.

The self-assembled monolayer 270 may include a head group, such as, a silanol group ($Si(OCH_3)_3$, $Si(OC_2H_5)_3$) or a silane group that combines with oxygen, a functional group ($CH_3$, $CF_3$, COOH, $NH_2$, etc.), and a carbon chain that connects the head group and the functional group. The carbon chain may be hydrocarbon and/or fluorocarbon. The self-assembled monolayer 270 may be hydrocarbon silane that includes a silane group. For example, the self-assembled monolayer 270 may be APTES, PTES, $FAS_3$, MPTMS, etc.

Charges generated due to the friction between the first electrode 210 and the self-assembled monolayer 270 move to an electrical load 205 connected to the first electrode 210, and thus, electrical energy is generated.

The configuration and the operation of the triboelectric generator 200 may be well understood from the example embodiment described with reference to FIG. 1, and thus, the description thereof will be omitted.

Figure 3:
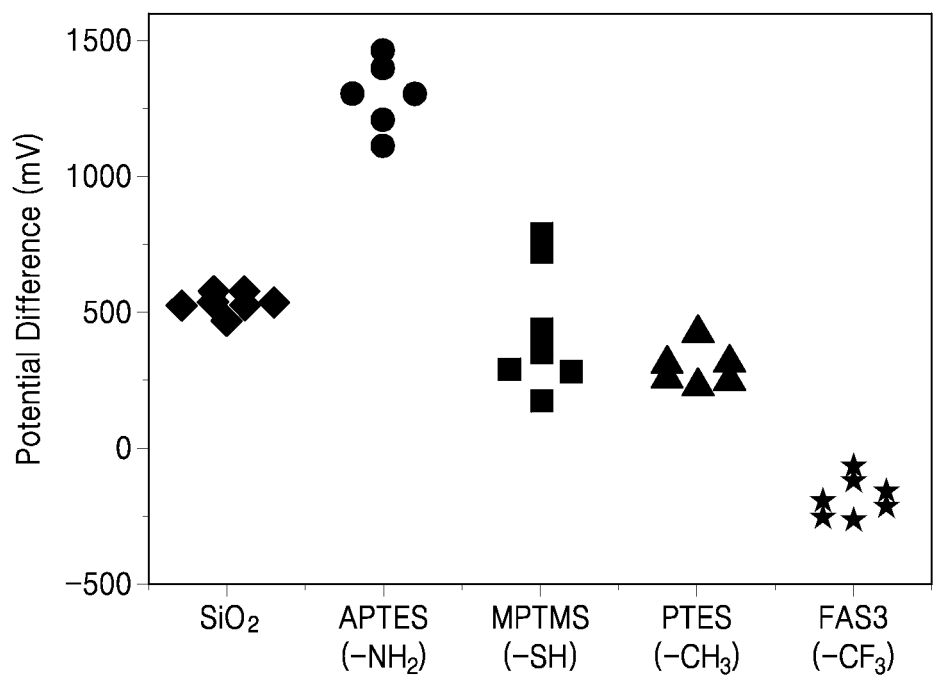
FIG. 3 is a graph showing potential differences according to hydrocarbon silanes when a surface of a silicon oxide substrate is treated with hydrocarbon silanes having functional groups that are different from each other.

FIG. 3 is a graph showing potential differences according to hydrocarbon silanes when a surface of a silicon oxide substrate is treated with hydrocarbon silanes having functional groups that are different from each other.

Samples in which self-assembled monolayers of different materials are respectively formed on a Si substrate (thickness of 675 μm) by using a vapor deposition method are prepared. A region (3 μm×3 μm) of the sample was scrubbed by using an Atomic Force Microscopy (AFM) having a tip coated with rhodium. A surface potential difference between the scrubbed region and an un-scrubbed region was obtained by measuring the potential with a Kelvin probe microscopy. The difference is a voltage generated due to the friction.

Referring to FIG. 3, if a self-assembled monolayer is not formed on a silicon oxide substrate ($SiO_2$ at the horizontal axis of FIG. 3), the generated voltage is approximately 500 mV. The APTES that is used as a self-assembled monolayer on the silicon oxide substrate includes an amino functional group (—$NH_2$) and has a relatively high generated voltage (APTES at the horizontal axis of FIG. 3). PTES includes a methane functional group (—$CH_3$), $FAS_3$ includes a trifluoromethyl functional group (—$CF_3$), and MPTMS includes a thiol functional group. PTES, $FAS_3$, and MPTMS have a relatively lower potential difference than the silicon oxide substrate.

Figure 4:
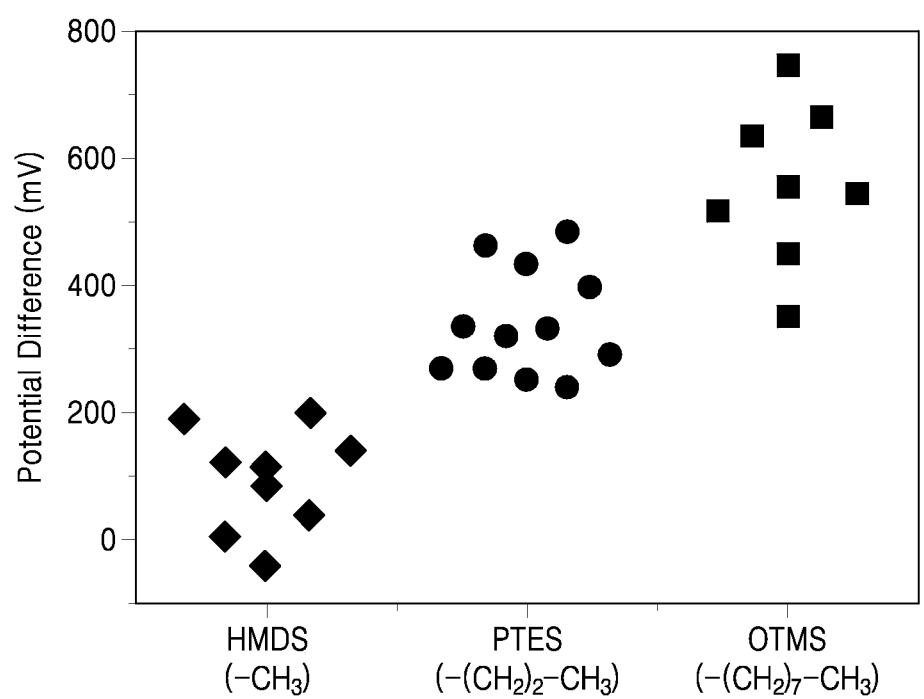
FIG. 4 is a graph showing variations of potential differences according to the number of carbon chains.

FIG. 4 is a graph showing variations of potential differences according to the number of carbon chains. A similar method used for the test described with reference to FIG. 3 was used.

Referring to FIG. 4, HMDS having a single carbon chain, PTES having three carbon chains, and oxygen trimethyl silane (OTMS) having 8 carbon chains are used as a self-assembled monolayer on a silicon oxide substrate. HMDS, PTES, and OTMS all include the same methane functional group. It is apparent that the friction potential difference is increased as the number of carbon chain increases. Accordingly, the amount of triboelectricity between two electrified substances may be increased by varying the number of carbon chains.

Figure 5:
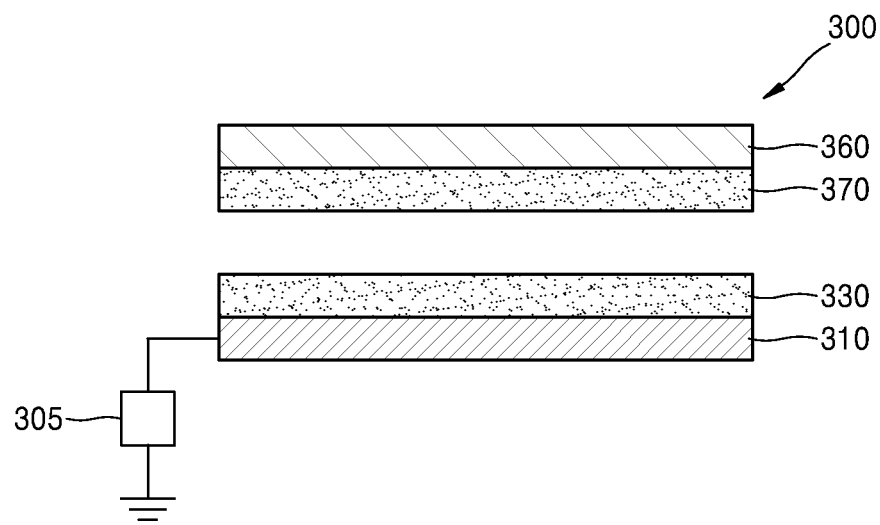
FIG. 5 is a cross-sectional view of a triboelectric generator according to another example embodiment.

FIG. 5 is a cross-sectional view of a triboelectric generator 300 according to another example embodiment. Like reference numerals are used to indicate elements that are substantially the same elements of the previous example embodiments, and the description thereof will not be repeated.

Referring to FIG. 5, the triboelectric generator 300 includes a first self-assembled monolayer 330 formed on a first electrode 310 and a triboelectric material layer 360 that faces the first self-assembled monolayer 330 and is separated from the first self-assembled monolayer 330 by a desired, or alternatively, predetermined gap. A second self-assembled monolayer 370 is formed on a surface of the triboelectric material layer 360 facing the first self-assembled monolayer 330.

The first electrode 310 may be formed of or include Al, Cu, Mg, W, Fe, Pt, Au, Ag, Ta, Ti, Pd, Ru, or an alloy of these metals. The first electrode 310 may also be formed of or include ITO.

When the first electrode 310 is formed of or includes a metal, the first self-assembled monolayer 330 may include a thiol group and a functional group ($CH_3$, $CF_3$, COOH, $NH_2$, etc.). The first self-assembled monolayer 330 includes a carbon chain between the thiol group and the functional group. The carbon chain may be hydrocarbon and/or fluorocarbon. For example, the first self-assembled monolayer 330 may be hydrocarbon thiol, such as methane thiol $CH_3SH$ and ethane thiol $C_2H_5SH$. The first self-assembled monolayer 330 may be HS—$(CH_2)_n$—$CH_3$ or HS—$(CH_2)_n$—$(CF_2)_m$—$CF_3$ where N and M are respectively integers of 1~30. The thiol group which is a functional group of the first self-assembled monolayer 330 may be combined with the first electrode 310.

When the first electrode 310 is formed of or includes ITO, the first self-assembled monolayer 330 may include a head group, such as, a silane group, a silazane group, a silanol group ($Si(OCH_3)_3$, $Si(OC_2H_5)_3$), a functional group ($CH_3$, $CF_3$, COOH, $NH_2$, etc.), and a carbon chain that connects the head group to the functional group. The carbon chain may include a hydrocarbon and/or fluorocarbon.

The first self-assembled monolayer 330 may be hydrocarbon silane that includes a silane group. For example, the first self-assembled monolayer 330 may be APTES, PTES, $FAS_3$, or MPTMS.

The triboelectric material layer 360 may be formed of or include a material that generates a large potential difference by friction with the first electrode 310 in a triboelectric series rating. For example, the triboelectric material layer 360 may be formed of or include a polymer including PDMS, polyimide, PVC, Teflon, etc.

The first self-assembled monolayer 330 may change the surface characteristic of the first electrode 310, and thus, may increase the amount of electrical energy generated by friction with the triboelectric material layer 360. That is, a friction characteristic of the first electrode 310 may be easily improved.

The first self-assembled monolayer 330 may be formed by using a solution process, a chemical vapor deposition method, a physical vapor deposition, or a spin coating process.

The second self-assembled monolayer 370 may include a head group that is combined with a surface of the triboelectric material layer 360, a functional group located on a surface thereof, and a tail that connects the head group to the functional group. The magnitude of triboelectric energy that is generated may vary according to the functional group.

A thickness of the second self-assembled monolayer 370 may vary according to the number of carbon chains thereof. For example, the second self-assembled monolayer 370 may have a thickness in a range from about 0.2 nm to about 5 nm.

Charges generated due to the friction between the first self-assembled monolayer 330 and the second self-assembled monolayer 370 may move to an electrical load 305 connected to the first electrode 310, and accordingly, electrical energy is generated.

Figure 6:
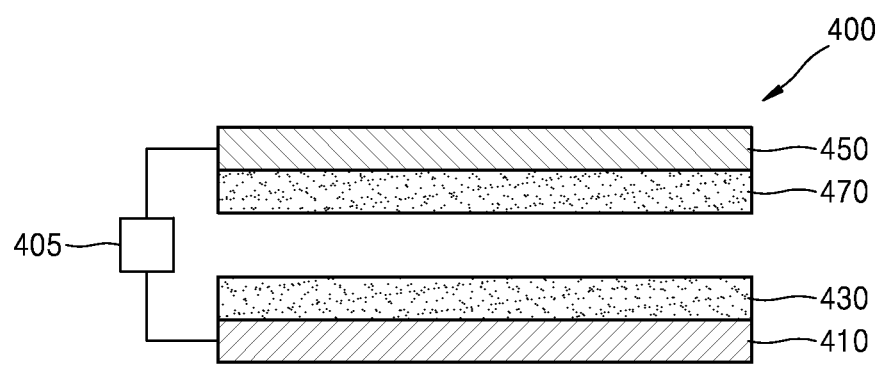
FIG. 6 is a cross-sectional view of a triboelectric generator according to another example embodiment.

FIG. 6 is a cross-sectional view of a triboelectric generator 400 according to another example embodiment. Like reference numerals are used to indicate elements that are substantially the same elements described above, and the description thereof will not be repeated.

Referring to FIG. 6, the triboelectric generator 400 includes a first electrode 410 and a second electrode 450 that are disposed to face each other. A first self-assembled monolayer 430 is formed on a surface of the first electrode 410 facing the second electrode 450. A second self-assembled monolayer 470 is formed on a surface of the second electrode 450 facing the first electrode 410.

The first electrode 410 and the second electrode 450 may be respectively formed of or include a metal or a metal oxide. The first electrode 410 and the second electrode 450 may be a metal formed of or including Al, Cu, Mg, W, Fe, Pt, Au, Ag, Ta, Ti, Pd, Ru, or an alloy of these metals.

When the first electrode 410 and the second electrode 450 are formed of or include a metal, the first self-assembled monolayer 430 may include a thiol group and a functional group ($CH_3$, $CF_3$, COOH, $NH_2$, etc.). The first self-assembled monolayer 430 includes a carbon chain between the thiol group and the functional group. The carbon chain may be hydrocarbon and/or fluorocarbon. For example, the first self-assembled monolayer 430 may be a hydrocarbon thiol, such as methane thiol ($CH_3SH$) and ethane thiol ($C_2H_5SH$). The first self-assembled monolayer 430 may be HS—$(CH_2)_n$—$CH_3$ or HS—$(CH_2)_n$—$(CF_2)_m$—$CF_3$. Here, N and M are respectively integers of 1~30. The thiol group which is a head group of the first self-assembled monolayer 430, may combine with the first electrode 410.

When the first electrode 410 is formed of or includes ITO, the first self-assembled monolayer 430 may include a head group, such as, a silane group, a silazane group, or a silanol group $Si(OCH_3)_3$, $Si(OC_2H_5)_3$, a functional group ($CH_3$, $CF_3$, COOH, $NH_2$, etc.), and a hydrocarbon and/or fluorocarbon which is a carbon chain that connects the head group to the functional group. For example, the first self-assembled monolayer 430 may be hydrocarbon silane that includes a silane group. For example, the first self-assembled monolayer 430 may be APTES, PTES, $FAS_3$, or MPTMS.

The first self-assembled monolayer 430 and the second self-assembled monolayer 470 respectively change a surface characteristic of the corresponding electrodes, and thus, an amount of electrical energy generated due the friction between the first self-assembled monolayer 430 and the second self-assembled monolayer 470 may be increased.

The second self-assembled monolayer 470 includes a head group that combines with a surface of the second electrode 450, a functional group located on a surface thereof, and a tail that connects the head group to the functional group. The magnitude of the triboelectric energy may vary according to the functional group.

The thicknesses of the first and second self-assembled monolayers 430 and 470 may vary according to the number of carbon chains thereof. For example, the first and second self-assembled monolayers 430 and 470 may have a thickness in a range from about 0.2 nm to about 5 nm, respectively.

Charges generated due to the friction between the first and second self-assembled monolayers 430 and 470 may move to an electrical load 405 that is connected to the first and second electrodes 410 and 450, and accordingly, electrical energy is generated.

The triboelectric generator 400 according to an example embodiment may increase triboelectric energy between the first and second self-assembled monolayers 430 and 470 by appropriately selecting materials of the first and second self-assembled monolayers 430 and 470.

Figure 7:
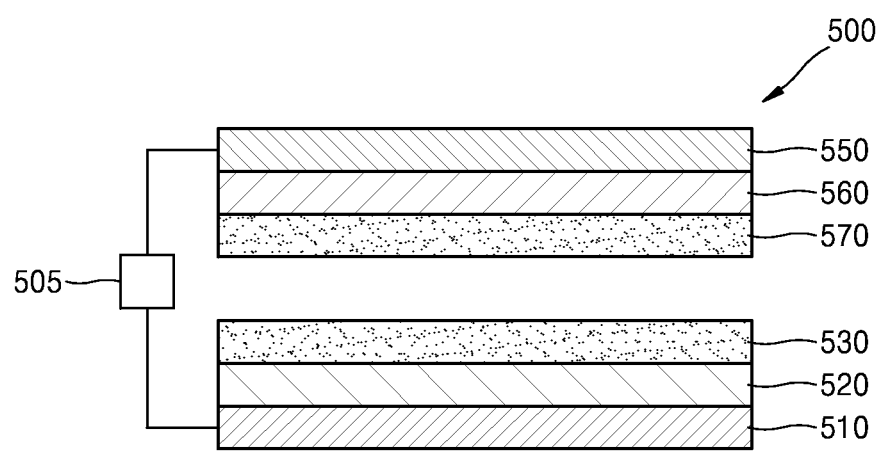
FIG. 7 is a cross-sectional view of a triboelectric generator according to another example embodiment.

FIG. 7 is a cross-sectional view of a triboelectric generator 500 according to another example embodiment. Like reference numerals are used to indicate elements that are substantially the same elements described above, and the description thereof will not be repeated.

Referring to FIG. 7, the triboelectric generator 700 includes a first electrode 510 and a second electrode 550 that are disposed to face each other. A first triboelectric material layer 520 and a first self-assembled monolayer 530 are sequentially formed on the first electrode 510 facing the second electrode 550. A second triboelectric material layer 560 and a second self-assembled monolayer 570 are sequentially formed on the second electrode 550 facing the first electrode 510.

The first electrode 510 and the second electrode 550 may be respectively formed of or include a metal or a metal oxide. The first electrode 510 and the second electrode 550 may be metals formed of or including Al, Cu, Mg, W, Fe, Pt, Au, Ag, Ta, Ti, Pd, Ru, an alloy of these metals, or ITO.

The first triboelectric material layer 520 and the second triboelectric material layer 560 may be formed of or include different materials from each other. For example, the second triboelectric material layer 560 may be formed of or include a material having a relatively positive electric charge in a triboelectric series rating, for example, glass, silicon oxide, etc. The second triboelectric material layer 560 may be or include a material having a relatively negative charge in a triboelectric series rating, and may be formed of or include a polymer that includes oxygen, such as PDMS, polyethylene terephthalate, polyimide, etc.

The first self-assembled monolayer 530 may be formed of or include a material that includes a silane group, a silazane group, or a silanol group that may combine with oxygen of the first triboelectric material layer 520.

The second self-assembled monolayer 570 may be formed of or include a material that includes a silane group, a silazane group, or a silanol group that may combine with oxygen of the second triboelectric material layer 560.

Charges generated due to the friction between the first and second self-assembled monolayers 530 and 570 move to an electrical load 505 connected to the first electrode 510 and the second electrode 550, and accordingly, electrical energy is generated.

The first and second self-assembled monolayers 530 and 570 respectively changes surface characteristics of the corresponding first and second triboelectric material layers 520 and 560, and thus, an amount of electrical energy generated by the friction between the first and second self-assembled monolayers 530 and 570 may be increased.

The triboelectric generator 500 according to the example embodiment may increase a triboelectric energy between the first and second self-assembled monolayers 530 and 570 by appropriately selecting materials of the first and second self-assembled monolayers 530 and 570.

While one or more example embodiments have been described with reference to the figures, it will be understood by those of ordinary skill in the art that various changes in form and details may be made therein without departing from the spirit and scope as defined by the following claims.

What is claimed is:

1. A triboelectric generator comprising:
a first electrode and a triboelectric material layer facing the first electrode; and
a first self-aligning monolayer that is combined with one of a surface of the first electrode and a surface of the triboelectric material layer, the first self-aligning monolayer being between the first electrode and the triboelectric material layer,
wherein the other one of the surface of the first electrode and the surface of the triboelectric material layer is not combined with a self-aligning monolayer, and
the first electrode comprises a metal oxide, and the first self-aligning monolayer includes a silane group or a silanol group combined with the surface of the first electrode.

2. The triboelectric generator of claim 1, wherein the first self-aligning monolayer has a thickness in a range from about 0.2 nm to about 5 nm.

3. The triboelectric generator of claim 1, wherein the triboelectric material layer comprises a polymer that has a greater amount of negative charges than the first electrode when there is a friction between the triboelectric material layer and the first electrode.

4. A triboelectric generator comprising:
a first electrode and a first triboelectric material layer facing each other;
a first self-aligning monolayer on a surface of the first electrode facing the first triboelectric material layer; and
a second self-aligning monolayer on a surface of the first triboelectric material layer facing the first electrode,
wherein the first triboelectric material layer is not in contact with an electrode, and
the first electrode comprises a metal oxide, and the first self-aligning monolayer includes a silane group or a silanol group combined with the surface of the first electrode.

5. The triboelectric generator of claim 4, wherein the first self-aligning monolayer has a thickness in a range from about 0.2 nm to about 5 nm.

6. The triboelectric generator of claim 4, wherein the second self-aligning monolayer comprises at least one of a silane group, a silanol group, and a thiol group combined with the surface of the first electrode.

7. The triboelectric generator of claim 4, wherein the first triboelectric material layer comprises a polymer including oxygen or a non-metallic oxide, and the second self-aligning monolayer includes a material that includes a silane group, a silazane group, or a silanol group.

8. A triboelectric generator comprising:
a first electrode and a first triboelectric material layer facing each other;
a second triboelectric material layer and a first self-aligning monolayer sequentially stacked on a surface of the first electrode facing the first triboelectric material layer; and
a second self-aligning monolayer on a surface of the first triboelectric material layer facing the first electrode,
wherein the first triboelectric material layer is not in contact with an electrode, the first self-aligning monolayer includes a functional group combined with a surface of the second triboelectric material layer, and the first triboelectric material layer comprises a polymer including oxygen or non-metallic oxide, and the second self-aligning monolayer comprises a material that includes a silane group, a silazane group, or a silanol group.

* * * * *